(12) United States Patent
Lee et al.

(10) Patent No.: US 6,733,854 B2
(45) Date of Patent: May 11, 2004

(54) POLYAMIDE RESIN COMPOSITION AND SYNTHETIC RESIN PRODUCT PREPARED THEREFROM

(75) Inventors: Sang-Rok Lee, Ansan (KR); Jin-Myung Choi, Songnam (KR)

(73) Assignees: Hyundai Motor Company, Seoul (KR); Honeyell Korea Ltd., Seoul (KR)

( * ) Notice: Subject to any disclaimer, the term of this patent is extended or adjusted under 35 U.S.C. 154(b) by 133 days.

(21) Appl. No.: 10/020,930

(22) Filed: Dec. 19, 2001

(65) Prior Publication Data

US 2002/0147272 A1 Oct. 10, 2002

(30) Foreign Application Priority Data

Dec. 29, 2000  (KR) ........................................ 2000-85828

(51) Int. Cl.$^7$ ......................... B29D 23/00; B29D 23/24; C08L 77/00
(52) U.S. Cl. .................... 428/35.8; 428/35.7; 428/36.9; 524/104; 524/127; 524/168; 525/66; 525/179
(58) Field of Search .................. 525/66, 179; 524/104, 524/127, 168; 428/35.8, 35.7, 36.9

(56) References Cited

U.S. PATENT DOCUMENTS

| | | | | |
|---|---|---|---|---|
| 5,179,164 A | * | 1/1993 | Lausberg et al. | ............ 525/179 |
| 5,317,059 A | * | 5/1994 | Chundury et al. | ............ 525/66 |

* cited by examiner

*Primary Examiner*—Ana Woodward
(74) *Attorney, Agent, or Firm*—Antonelli, Terry, Stout & Kraus, LLP

(57) ABSTRACT

Disclosed are a polyamide resin composition and a synthetic resin product prepared therefrom. The polyamide resin composition comprises 30–95 parts by weight of polyamide resin, 1–45 parts by weight of impact resistant component, 0.1–20 parts by weight of nylon plasticizer, 0.01–5 parts by weight of nylon thickener having at least two functional groups at the ends of its polymer chain and 0.5–10 parts by weight of core-shell rubber. Such composition is advantageous in light of much lower preparation cost, while retaining higher flexibility, moldability and excellent external appearance, compared to conventional nylon elastomer reinforced polyamide resin composition. Thereby, the composition can be effectively applied to internal or external decorative articles for motor vehicles and electrical or electronic components.

12 Claims, No Drawings

POLYAMIDE RESIN COMPOSITION AND SYNTHETIC RESIN PRODUCT PREPARED THEREFROM

BACKGROUND OF THE INVENTION

1. Field of the Invention

The present invention concerns a polyamide resin composition having excellent gasoline resistance and impact resistance under cold environment, which is applicable to a fuel tube system for a motor vehicle.

2. Description of the Prior Art

In general, polyamide resins are a general term applied to polymers consisting of amide (—CONH—) groups joined by linear aliphatic sections. Representative of the resins are nylon-6,6 obtained by condensation of adipic acid and hexamethylenediamine, and nylon 6, which is a polymerization product of $\epsilon$-caprolactam. An original polyamide introduced to the market as a synthetic fiber is known as 6,6polyamide under the trademark name nylon. However, in these days, the general term 'nylon', instead of polyamide, is widely used.

Polyamides are very excellent in mechanical strength, abrasion resistance, heat resistance, chemical resistance, electrical insulation and arc resistance, and are thus variously employed to internal or external decorative materials of motors, electrical or electronic components, sporting goods and industrial materials. Since the polyamides suffer from the drawbacks of low compatibility, flexibility, viscosity and workability with rubber, despite numerous applications in internal or external decorative materials for motor vehicles, they have limitations for use in internal tubes of motors or hoses.

Thus, with a view to overcome the drawbacks of conventional polyamide resins, there is provided a polyamide resin reinforced with a nylon elastomer having excellent moldability and flexibility. In this regard, U.S. Pat. Nos. 4,230,838, 4,331,786, 4,332,920 and 4,207,410 disclose a polyamide elastomer of polyoxytetramethylene glycol, included in polyether structure, by substituting an elastomer for a chain-limitator having 4 to 19 carbon atoms between amide groups in polyamide.

In addition, U.S. Pat. No. 5,919,865 refers to a high-impact polyamide composition prepared by adding ethylene propylene rubber (EPR), ethylene propylene diene monomer (EPDM) rubber and maleic anhydride modified SEBS-g-MA to the polyamide. U.S. Pat. No. 5,559,185 discloses a thermoplastic resin composition and U.S. Pat. No. 5,688,866 refers to an impact modification of thermoplastics.

However, the polyamide elastomer of polyoxytetramethylene glycol has an average molecular weight of at most 600 to 800. In addition, the elastomers prepared by the above conventional methods do not have excellent flexibility and toughness.

The above compositions are improved in flexibility and impact resistance, but are disadvantageous in that, when they are actually employed as tube materials of a motor fuel system, external appearance and workability become poor and thickness of final articles is irregular. Also, disperability of rubber is lowered and uniform polyamide resin composition is difficult to obtain during extrusion.

With a view to resolve the above problems, a relatively inexpensive rubber and plasticizer capable of providing high gasoline resistance, impact resistance under cold environment, elongation under tension, good external appearance of molded articles and excellent flexibility, and a thickener useful for improvement of workability, are used to yield materials having more excellent flexibility, elongation and impact strength, external appearance and gasoline resistance, compared to conventional nylon elastomer reinforced polyamide resins.

SUMMARY OF THE INVENTION

Aiming to solve the above problems, we, the inventors of the present invention, have developed a novel polyamide resin composition. It is found that, when a rubber having good dispersability, a nylon thickener for obtaining uniformly thick components and uniform workability, a plasticizer of nylon responsible for providing flexibility suitable for motor fuel tube systems, and a core-shell rubber for increasing external appearance, elongation and impact strength, are used, there is yielded a polyamide resin composition which has flexibility, workability, impact resistance under cold environment and external appearance equal to or better than those of conventional nylon elastomer reinforced polyamide resin composition.

Thus, it is an object of the present invention to provide a polyamide resin composition.

It is another object of the present invention to provide a synthetic resin product prepared from the polyamide resin composition.

DETAILED DESCRIPTION OF THE INVENTION

To achieve the objects, the present invention provides a polyamide resin composition comprising (a) 30–95 parts by weight of polyamide resin, (b) 1–45 parts by weight of an impact resistant component selected from the group consisting of ethylene propylene copolymer rubber (EPM), ethylene propylene rubber (EPR), ethylene propylene diene monomer rubber (EPDM), maleic anhydride modified ethylene propylene rubber (EPR-g-MA), maleic anhydride modified ethylene propylene copolymer rubber (EPM-g-MA), maleic anhydride modified ethylene propylenediene monomer rubber (EPDM-g-MA), arylmethacrylate-butadiene-styrene (MBS), styrene-butadiene-styrene triblock copolymer, all-acrylic core-shell rubber, ethylene ethylacrylate (EEA), styrene butadiene rubber (SBR), ethylene vinylalcohol (EVOH), various thermoplastic elastomers and plastomers, or mixtures thereof, (c) 0.1–20 parts by weight of nylon plasticizer, (d) 0.01–5 parts by weight of nylon thickener having at least two functional groups at the ends of its polymer, and (e) 0.5–10 parts by weight of core-shell rubber.

Further, the present invention provides a polyamide resin composition characterized in that the polyamide is selected from the group consisting of nylon 6, nylon 7, nylon 8, nylon 10, nylon 2, nylon 66, nylon 69, nylon 610, nylon 611, nylon 612, nylon 6T, nylon 6/66, nylon 6/12, nylon 6/6T, or combinations thereof.

Further, the present invention provides a polyamide resin composition characterized in that the polyamide is a homopolymer; a copolymer blended or copolymerized with at least one selected from the group consisting of polyimide, polysulfone, polyethersulfone, polyphenylene sulfide, polyphenylene ether or polyphenylene oxide, high-impact polystyrene, acrylonitrile-butadiene-styrene copolymer, acrylonitrile-ethylenepropylene-styrene, acrylonitrile-styrene-alkylacrylate, polycarbonate, polyethylene terephthalate and polybutyleneterephthalate; or a mixture of the homopolymer and the copolymer.

Further, the present invention provides a polyamide resin composition characterized in that the polyamide comprises semi-crystalline, amorphous structures, or mixtures thereof.

Further, the present invention provides a polyamide resin composition characterized in that the nylon plasticizer is selected from the group consisting of lactams, sulfonamides, phthalates, adipates, phosphates, glycolates, or mixtures thereof.

Further, the present invention provides a polyamide resin composition characterized in that the nylon thickener is selected from the group consisting of maleic anhydride modified polyolefin, maleic anhydride modified styrene resin and polyfunctional epoxy resin.

Further, the present invention provides a polyamide resin composition characterized in that the core-shell rubber comprises a hard polymer having a glass transition temperature of 25° C. or higher and a soft polymer having a glass transition temperature of 0° C. or higher.

Further, the present invention provides a polyamide resin composition characterized in that the hard polymer and the soft polymer in the core-shell rubber have a weight ratio of 1:9 to 9:1.

Further, the present invention provides a polyamide resin composition characterized in that the core-shell rubber contains 0.1–25 parts by weight of a reaction monomer on the basis of the whole weights of the core-shell rubber, the reaction monomer being selected from maleic acid, maleic anhydride, monoester or diester of maleic acid, tert-butylacrylate, acrylic acid, glycidylacrylate and vinyloxazoline, or mixtures thereof.

Further, the present invention provides a polyamide resin composition characterized by further comprising at least one selected from the group consisting of stabilizers, light stabilizers, heat stabilizers, UV stabilizers, lubricants, release agents, pigments, dyes, flame retardants, fiber reinforcing fillers, nucleating agents, or mixtures thereof.

In addition, the present invention provides a synthetic resin product prepared from the polyamide resin composition.

Further, the present invention provides a fuel tube for motor vehicles and a hose prepared from the polyamide resin composition.

Hereinafter, the invention will be defined in greater detail.

In the polyamide resin composition of the present invention, polyamide resin (A) can be obtained by homopolymerization or polycondensation of cyclic lactam having three rings or more, or -amino acid, and may also be a product of condensation of a diacid and a diamine. In addition, homopolyamides, copolyamides or mixtures of the above polyamides may be used, in which the polyamide comprises semi-crystalline and/or amorphous structures.

As the homopolymerizable monomer, use can be made of -caprolactam, aminocaproic acid, oenantholactam, 7-aminoheptanoic acid, 11-aminoundecanoic acid, 9-aminononanoic acid, -piperidone, or mixtures thereof. In addition, a diamine can be polycondensed with a dicarboxylic acid to obtain polyamide polymer or copolymer, in which the diamine is selected from the group consisting of tetramethylene diamine, hexamethylene diamine, nonamethylene diamine, decamethylene diamine, undecamethylene diamine, dodecamethylene diamine, para-aminoaniline or meta-xylene diamine, and the dicarboxylic acid is exemplified by adipic acid, sebacic acid, dodecandioic acid, glutaric acid, terephthalic acid, 2-methyl terephthalic acid, isophthalic acid and naphthalene dicarboxylic acid.

In addition to diacids or diamines, polyfunctional compounds, such as trimellitic acid and pyromellitic acid, which have 3 or more functional groups, may be used in the range of 5 mol % or less. Parts of nylon monomer-remaining polyamide on polymerization may be also employed so as for increasing flexibility and viscosity. As the polyamide resin, nylons 6, 7, 8, 10, 2, 66, 69, 610, 611, 612, 6T, 6/66, 6/12 and 6/6T are used. Of them, nylon 6, nylon 66, and nylon 6/66 are preferably utilized. Further, blends having various content ratios and any combinations of these nylon resins may be used.

The polymerization method is any one selected from the group consisting of anionic polymerization, bulk melt polymerization, solution polymerization, melt polymerization through salt, interfacial polymerization, and reaction extrusion. The polyamide copolymer obtained by polycondensing at least two monomers can be used, regardless of its component ratios.

With the intention of increasing weight, strength, heat resistance or impact resistance, the polyamide can be blended or copolymerized with any one of the group comprising polyimide, polysulfone, polyether sulfone, polyphenylene sulfide, polyphenylene ether or polyphenylene oxide (PPO), high-impact polystyrene (HIPS), acrylonitrile-butadiene-styrene (ABS) copolymer, acrylonitrile-ethylenepropylene-styrene (AES) copolymer, acrylonitrile-styrene-allylacrylate (ASA), polycarbonate (PC), polyethylene terephthalate (PET), or polybutylene terephthalate (PBT). Further, commercially available additives such as oxazoline modified polystyrene and maleic anhydride modified polyolefin may be used for improvement in performance of the above blends.

The component (A) is used in the amount of 30–95 parts by weight, and preferably, in the amount of 45–70 parts by weight.

The impact resistant component (B) is exemplified by EPM or EPR as two-member copolymer of ethylene propylene, EPDM as ethylene propylendiene monomer, allyl methacrylate-butadiene-styrene (M BS), styrene-butadiene-styrene (SBS) triblock copolymer, maleic anhydride modified EPM (EPM-g-MA), maleic anhydride modified SBS (SBS-g-MA), maleic anhydride modified EPDM (EPDM-g-MA), all-acrylic core-shell rubber, ethylene ethylacrylate (EEA), styrene butadiene rubber (SBR), ethylene vinylalcohol (EVOH), various thermoplastic elastomers and plastomers. Of them, it is preferred that EPM, EPDM, EPR, maleic anhydride modified EPM, maleic anhydride modified EPDM, and maleic anhydride modified EPR are used as the impact resistant component. Also, carboxylic acid or maleic anhydride may be added for improving the performance.

The above component (B) is used in the amount of 1–45 parts by weight, and preferably in the amount of 15–35 parts by weight, based on the total resin composition.

The nylon plasticizer as the component (C) is responsible for increasing the flexibility of the composition, and includes, but is not limited to, lactams such as caprolactam and lauryl lactam; and sulfonamides, such as o,p-toluene sulfonamide and n-ethyl o,p-toluene sulfonamide.

Other plasticizers can be used, such as not only sulfonamides, trimellitates and polymer type plasticizers, but also phthalates, adipates, phosphates, and glycolates.

Further, the other available plasticizers is disclosed in U.S. Pat. No. 4,197,379. The component (C) is added in the amount of 0.1–20 parts by weight based on the total resin composition. Preferably, it is used in the amount of 5–15 parts by weight.

However, as the component (C) is increased in its amounts, the resin composition has improved flexibility but has an unsuitable melt index for extrusion or blow molding. Thus, the component (D) having at least two functional groups at the ends of its polymer chain is used, such that the resin composition has an appropriate melt index. Representative of the component (D) is styrene maleic anhydride resin (SMA) of maleic anhydride modified polymer structure, and modified polyolefins, or polymers having similar reactive groups. In addition, polyfunctional epoxy resins, such as cresol novolac epoxy and phenol novolac epoxy, may be used.

The component (D) is used in the amount of 0.01–5 parts by weight, and preferably in the amount of 0.1–3 parts by weight, of the total resin composition.

The component (E) of the present invention, for further improving the external appearance of molded products, elongation under tension, impact resistance under cold environment, is a core shell type rubber comprising at least one hard portion and soft portion. The hard portion and the soft portion comprise a polymer having glass transition temperature of 25° C. or higher and a polymer having glass transition temperature not more than 0° C., respectively. Such composition has a single core and at least one shell structure, in which the structure is determined by the added monomer sequences. Examples of the soft portion include butadiene, isoprene, alkylacrylate, alkylmethacrylate or siloxane, and comonomer-derived materials. Preferred core-shell rubber includes one soft core and a single hard shell. The reactive groups comprise carbonyl, carboxyl, anhydride, amido, imido, carboxylic ester, amino, hydroxyl, epoxy, oxazoline, urethane, urea, lactam or halobenzene group. The polymerization of the final shell is carried out by addition of a monomer having suitable reactive groups. For example, suitable reaction monomers comprise maleic acid, maleic anhydride, monoesters or diesters of maleic acid, tert-butylacrylate, acrylic acid, glycidylacrylate, and vinyloxazoline.

Such reaction monomer is used in the amount of 0.1–25 parts by weight and preferably in the amount of 0.25–15 parts by weight, to the whole weights of the core-shell rubber. The ratio of the soft component and the hard component is 1:9 to 9:1, and preferably 3:7 to 8:2. EP-A-208187 discloses such rubber. The component (E) is added in the amount of 0.1–10 parts by weight, and preferably, in the amount of 0.5–5 parts by weight, on the basis of the total resin composition.

To the composition of the present invention, essential additives, such as stabilizers, stabilizing agents resistant to light, heat and UV, lubricants, release agents, pigments, dyes, flame retardants, fiber reinforcing fillers, and nucleating agents may be added, within the scope of not affecting physical properties, external appearance and workability of final articles.

Representative antioxidants and heat stabilizing agents are metal halogenides, namely, sodium, potassium, lithium, copper halogenides, and chlorine, bromine, zinc, hindered phenol, various phosphates, hydroquinones, or mixtures thereof.

As the UV stabilizing agent, use can be made of resorcinols, salicylates, hindered amines, benzotriazoles and benzophenols. As for the lubricants and the release agents, stearic acid, stearyl alcohol, stearamides, wax, carbonate ester, and carbonate metallate are used. Nigrosine is used as organic dyes, and as pigments, use is made of titanium dioxide, cadmium sulfide, selenite cadmium, ultramarine blue, carbon black.

As the flame retardants, organic halogen compound and non-halogen compounds, and metal hydroxide compounds are used.

Further, as for common reinforcing fillers, glass fibers, glass beads, glass flakes, mica, talc, carbon fibers, kaolin, wallastonite, molybdenum disulfide, potassium titanate, barium sulfate, conductive carbon black, and aramid fibers are representatively used. In addition, fire-proofing agents, anti-drip agents, magnetic agents, EMI masking agents, antibacterial agents, antimicrobial agents, metal deactivators, far infrared radiation agents, and antistatic agents may be included.

The resin composition components of the present invention, along with essential additives (lubricants, stabilizers etc.), are primarily mixed by use of a super mixer, and then blended by a twin-screw extruder, a single-screw extruder, roll-mill, kneader or banbury mixer, and preferably by twin-screw extruder, under no vacuum, to obtain a pellet using a pelletizer, which is then sufficiently dried in a dehumidifier, injected and measured for its physical properties.

A better understanding of the present invention may be obtained in light of the following examples which are set forth to illustrate, but are not to be construed to limit the present invention.

EXAMPLES 1–11

Nylon 6, caprolactam, maleic anhydride modified EPM rubber (EPM-g-MA), sulfonamide plasticizer (liquid), core-shell rubber, thickener, and carbon black masterbatch were mixed according to the ratios of the following table 1, blended using a twin-screw extruder at 240° C., pelletized with a pelletizer and then dried at 70° C. and 90° C. over time in a dehumidifier. While changing rotation rates of the screw, the composition was dried at 70° C. in a dehumidifier for a predetermined period of time, and molded in an injector. The injected pieces were measured for physical properties and external appearance according to the following standard method. With the intention of examining the dispersability of the rubber, a thin film was made and observed with an optical microscope.

Physical Properties Test Method

Tensile strength and elongation: ASTM D 638, 50 mm/min.

Flexible strength and flexible elastic modulus : ASTM D 790, 10 mm/min.

Izod impact strength, room temperature and 40° C. : ASTM D 256, ¼ inch thick test piece, izod notched.

Melt Index: ASTM D 1238 235° C., 2.16 kgf.

Gasoline resistance test

*Gasoline 50° C., after 48 and 96 hours

Flexible strength and flexible elastic modulus: ASTM D 790 10 mm/min.

External Appearance Assay

The compositions obtained at different screw rotation rates were made to 0.05 mm thick films, and the dispersed rubber state in the films was observed by an optical microscope. External appearance was assayed by naked eye.

Good dispersability, smooth surface observed by naked eye: ●

Very small rubber lumps, fine projections on molded product observed by naked eye: ▲

Large rubber lumps, many projections on molded product observed by naked eye: x

COMPARATIVE EXAMPLE 1

Expensive nylon elastomer reinforced polyamide 6 resin composition was dried at 150° C. for 12 hours and sintered at 950° C. for 12 hours.

The polyamide resin composition was blended in a twin-screw extruder at 250 rpm, pelletized by use of a pelletizer and then dried at 70° C. for 5 hours in a dehumidifier, thus measuring its general physical properties. The results are shown in Table 1, below, in which each component has the unit of parts by weight.

TABLE 1

| | Ex. No. | | | | | | | | | | | C. Ex. |
|---|---|---|---|---|---|---|---|---|---|---|---|---|
| | 1 | 2 | 3 | 4 | 5 | 6 | 7 | 8 | 9 | 10 | 11 | 1 |
| Nylon 6 | 59.8 | 59.3 | 55.8 | 53.3 | 54.3 | 51.8 | 54.8 | 52.8 | 58.2 | 55.5 | 57.8 | 55.0 |
| Caprolactam | 8.0 | 8.0 | 8.0 | 8.0 | 8.0 | 8.0 | 8.0 | 8.0 | 8.0 | 8.0 | 8.0 | 8.0 |
| EPDM-g-MA | 30.0 | 30.0 | 30.0 | 30.0 | 30.0 | 30.0 | 30.0 | 30.0 | 30.0 | 30.0 | 30.0 | — |
| Nylon Elastomer | — | — | — | — | — | — | — | — | — | — | — | 35.0 |
| Sulfonamide Based material | — | 0.5 | 1.5 | 1.5 | 3.0 | 3.0 | 5.0 | 7.0 | 1.5 | 1.5 | 1.5 | — |
| Thickener | 0.2 | 0.2 | 0.2 | 0.2 | 0.2 | 0.2 | 0.2 | 0.2 | 0.3 | 0.5 | 0.7 | — |
| Core-shell rubber | — | — | 2.5 | 5.0 | 2.5 | 5.0 | — | — | — | 2.5 | — | — |
| Carbonblack masterbatch | 2.0 | 2.0 | 2.0 | 2.0 | 2.0 | 2.0 | 2.0 | 2.0 | 2.0 | 2.0 | 2.0 | 2.0 |
| Melt Index (−g/10 min) | 0.5 | 0.7 | 1.0 | 0.8 | 1.5 | 1.1 | 3.2 | 4.3 | 1.3 | 0.08 | 0.6 | 1.1 |
| Tensile strength (kg/cm$^2$) | 405 | 405 | 405 | 400 | 390 | 385 | 400 | 350 | 420 | 405 | 420 | 400 |
| Elongation (%) | 235 | 245 | 280 | 290 | 285 | 300 | 265 | 270 | 220 | 255 | 205 | 210 |
| Flexible Strength (kg/cm$^2$) | 244 | 240 | 230 | 210 | 210 | 200 | 235 | 185 | 250 | 218 | 260 | 210 |
| Flexible elastic modulus (kg/cm$^2$) | 6200 | 6000 | 5600 | 5100 | 5000 | 4600 | 4100 | 3600 | 5200 | 5000 | 6500 | 4750 |
| Impact strength (23° C., kg · cm/cm) | NB | NB | NB | NB | NB | NB | NB | NB | NB | NB | NB | NB |
| Impact strength (−40° C., kg · cm/cm) | 17.0 | 18.8 | 20.2 | 21.6 | 19.0 | 22.3 | 17.3 | 17.9 | 16.1 | 19.6 | 16.5 | 10.5 |
| External Appearance | X | ▲ | ● | ● | ● | ● | ▲ | ▲ | X | ● | X | ▲ |
| Plasticizer Dissolution | ● | ● | ● | ● | ▲ | ▲ | X | X | ● | ● | ● | ● |

The properties of the resin composition of the example 4 in the above table 1, which were equal to or better than those of nylon elastomer reinforced polyamide 6 resin composition, were measured according to temperature and time in a dehumidifier, and dissolution of the plasticizer was tested (screw rotation rate : 250 rpm). The results are given in the following table 2.

The properties of the resin composition of the example 4 in the above table 1, which were equal to or better than those of nylon elastomer reinforced polyamide 6 resin composition, were measured according to temperature and time in a dehumidifier, and dissolution of the plasticizer was tested. The results are given in Table 3, below.

TABLE 2

| | Ex. No. 4, Dehumidifier 70° C. | | | C. Ex., Dehumidifier 70° C. | | |
|---|---|---|---|---|---|---|
| | 3 h | 5 h | 9 h | 3 h | 5 h | 9 h |
| Melt Index (−g/10 min) | 0.9 | 0.8 | 0.8 | 1.3 | 1.1 | 1.1 |
| Tensile Strength (kg/cm$^2$) | 390 | 400 | 385 | 380 | 400 | 390 |
| Elongation (%) | 245 | 290 | 230 | 185 | 210 | 190 |
| Flexible Strength (kg/cm$^2$) | 195 | 210 | 222 | 198 | 210 | 225 |
| Flexible Elastic modulus (kg/cm$^2$) | 4900 | 5100 | 5210 | 4600 | 4750 | 5150 |
| Impact Strength (23° C., kg · cm/cm) | NB | NB | NB | NB | NB | NB |
| Impact Strength (−40° C., kg · cm/cm) | 21.1 | 21.6 | 21.3 | 10.0 | 10.5 | 9.3 |
| Plasticizer dissolution | ● | ● | ▲ | ● | ● | ▲ |

TABLE 3

|  | Ex. No. 4 Dehumidifier 90° C. | | | C. Ex. 1 Dehumidifier 90° C. | | |
| --- | --- | --- | --- | --- | --- | --- |
|  | 3 h | 5 h | 9 h | 3 h | 5 h | 9 h |
| Melt Index (−g/10 min) | 0.8 | 0.8 | 0.7 | 1.0 | 1.0 | 0.9 |
| Tensile Strength (kg/cm$^2$) | 410 | 400 | 380 | 395 | 387 | 370 |
| Elongation (%) | 270 | 255 | 225 | 210 | 185 | 165 |
| Flexible Strength (kg/cm$^2$) | 218 | 238 | 255 | 210 | 235 | 251 |
| Flexible Elastic modulus (kg/cm$^2$) | 5150 | 5300 | 5700 | 4900 | 5250 | 5900 |
| Impact Strength (23° C., kg · cm/cm) | NB | NB | NB | NB | NB | NB |
| Impact Strength (−40° C., kg · cm/cm) | 21.2 | 20.0 | 18.4 | 10.7 | 10.1 | 9.3 |
| Plasticizer dissolution | ▲ | X | X | X | X | X |

The resin composition of the example 4 in the above table 1, having properties equal to or better than those of nylon elastomer reinforced polyamide 6, was measured for properties varying with screw rotation rates, and the external appearance of 0.05 mm thick film was observed by an optical microscope (dehumidifier 70° C., 5 hours). The results are given in Table 4, below.

TABLE 4

|  | Ex. No. 4, screw rotation rate | | | C. Ex. |
| --- | --- | --- | --- | --- |
|  | 150 | 250 | 350 | 1 |
| Melt Index (−g/10 min) | 1.2 | 0.8 | 0.8 | 1.1 |
| Tensile Strength (kg/cm$^2$) | 370 | 400 | 410 | 390 |
| Elongation (%) | 210 | 290 | 305 | 210 |
| Flexible Strength (kg/cm$^2$) | 205 | 210 | 210 | 210 |
| Flexible Elastic modulus (kg/cm$^2$) | 5000 | 5100 | 5150 | 4750 |
| Impact Strength (23° C., kg · cm/cm) | NB | NB | NB | NB |
| Impact Strength (−40° C., kg · cm/cm) | 18.5 | 21.6 | 21.8 | 10.5 |
| Microscope Observation | X | ▲ | ● | ▲ |

As can be seen in the above table 4, physical properties and external appearance of the composition prepared at screw rotation of 350 rpm after drying at 70° C. for 5 hours in a dehumidifier are equal to or better than those of nylon elastomer reinforced polyamide 6.

The resin compositions of the example 4 and the comparative example 1 were immersed in gasoline at 50° C. for 48 hours and 96 hours, after which their properties and whiteness were measured. The results are presented in the following table 5.

TABLE 5

|  | Ex. No. 4 | | | C. Ex. | | |
| --- | --- | --- | --- | --- | --- | --- |
|  | After Injection | After 48 h | After 96 h | After Injection | After 48 h | After 96 h |
| Oil Absorption(%) | — | 0.14 | 0.17 | — | 0.12 | 0.15 |
| Flexible Strength(kg/cm$^2$) | 210 | 250 | 255 | 210 | 246 | 250 |
| Flexible Elastic Modulus(kg/cm$^2$) | 5100 | 5700 | 5750 | 4750 | 5550 | 5600 |
| External Appearance | ● | ● | ● | ▲ | ▲ | ▲ |
| Whiteness | No | No | No | No | No | No |

The polyamide composition of the present invention comprising 30–95 parts by weight of polyamide resin, 1–45 parts by weight of an impact resistant component, 0.1–20 parts by weight of nylon plasticizer, 0.01–5 parts by weight of nylon thickener having at least two functional groups at the ends of its polymer chain and 0.5–10 parts by weight of core-shell rubber, is higher in flexibility, moldability and external appearance, and also much lower in price, compared to a conventional nylon elastomer reinforced polyamide resin composition. Thus, the composition is effectively applicable to internal and external decorative components for motor vehicles, and electrical or electronic components.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A polyamide resin composition, comprising, on the basis of 100 parts by weight of the whole resin composition:
   (A) 45–70 parts by weight of polyamide resin;
   (B) 15–35 parts by weight of at least one impact resistant component selected from the group consisting of ethylene propylene copolymer rubber (EPM), ethylene propylene diene monomer rubber (EPDM), maleic anhydride modified ethylene propylene copolymer rubber (EPM-g-MA), maleic anhydride modified ethylene propylenediene monomer rubber (EPDM-g-MA), methacrylate-butadiene-styrene (MBS), styrene-butadiene-styrene triblock copolymer, ethylene ethylacrylate (EEA), and styrene butadiene rubber (SBR);

(C) 5–15 parts by weight of plasticizer selected from the group consisting of lactams, sulfonamides, phthalates, adipates, phosphates, and glycolates;

(D) 0.1–3 parts by weight of thickener selected from the group consisting of maleic anhydride modified olefin homopolymer, maleic anhydride modified styrene resin (SMA), cresol novolac epoxy resin and phenol novolac epoxy resin; and (E) 0.5–5 parts by weight of core-shell rubber comprising at least a hard polymer having a glass transition temperature of at least 25° C. and at least a soft polymer having a glass transition temperature of at most 0° C., with a weight ratio of 1:9 to 9:1.

2. The composition as defined in claim 1, wherein the polyamide is selected from the group consisting of nylon 6, nylon 7, nylon 8, nylon 10, nylon 2, nylon 66, nylon 69, nylon 610, nylon 611, nylon 612, nylon 6T, nylon 6/66, nylon 6/12, and nylon 6/6T.

3. A fuel tube for motor vehicles prepared from the polyamide resin composition of claim 2.

4. The composition as defined in claim 1, wherein the polyamide is:

(i) a homopolymer; or (ii) a polyamide copolymer blended or copolymerized with at least one selected from the group consisting of polyimide, polysulfone, polyethersulfone, polyphenylene sulfide, polyphenylene ether or polyphenylene oxide, high-impact polystyrene, acrylonitrile-butadiene-styrene copolymer, acrylonitrile-ethylenepropylene-styrene copolymer, acrylonitrile-styrene-alkylacrylate copolymer, polycarbonate, polyethylene terephthalate and polybutyleneterephthalate; or (iii) a mixture of the homopolymer (i) and the polyamide copolymer (ii).

5. A fuel tube for motor vehicles prepared from the polyamide resin composition of claim 4.

6. The composition as defined in claim 1, wherein the polyamide is semi-crystalline, or amorphous structures, or mixtures thereof.

7. A fuel tube for motor vehicles prepared from the polyamide resin composition of claim.

8. The composition as defined in claim 1, wherein the final shell of the core-shell rubber contains 0.1–25 parts by weight, on the basis of the whole weights of the core-shell rubber, of a monomer having a reactive functional group, said monomer being selected from maleic acid, maleic anhydride, monoester or diester of maleic acid, tert-butylacrylate, acrylic acid, glycidylacrylate, vinyloxazoline, or mixtures thereof.

9. A fuel tube for motor vehicles prepared from the polyamide resin composition of claim 8.

10. A fuel tube for motor vehicles prepared from the polyamide resin composition of claim 1.

11. The composition as defined in claim 1, wherein the core-shell rubber has a core of the hard polymer and a shell of the soft polymer.

12. The composition as defined in claim 1, wherein the soft polymer is of a material selected from the group consisting of butadiene, isoprene, alkylacrylate, alkylmethacrylate and siloxane.

* * * * *